(12) United States Patent
Rathod et al.

(10) Patent No.: US 10,287,648 B2
(45) Date of Patent: May 14, 2019

(54) TRACK BUSHING

(71) Applicant: Caterpillar Inc., Peoria, IL (US)

(72) Inventors: Chandrasen Rameshlal Rathod, Peoria, IL (US); Tao Lin, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 207 days.

(21) Appl. No.: 15/587,925

(22) Filed: May 5, 2017

(65) Prior Publication Data
US 2018/0320244 A1 Nov. 8, 2018

(51) Int. Cl.
| | | |
|---|---|---|
| *C23C 8/22* | (2006.01) | |
| *C21D 9/08* | (2006.01) | |
| *C23C 8/80* | (2006.01) | |
| *C21D 1/18* | (2006.01) | |
| *B62D 55/20* | (2006.01) | |
| *C21D 1/42* | (2006.01) | |
| *C21D 1/58* | (2006.01) | |
| *C21D 1/60* | (2006.01) | |

(52) U.S. Cl.
CPC ............ *C21D 9/085* (2013.01); *B62D 55/202* (2013.01); *C21D 1/18* (2013.01); *C23C 8/22* (2013.01); *C23C 8/80* (2013.01); *C21D 1/42* (2013.01); *C21D 1/58* (2013.01); *C21D 1/60* (2013.01)

(58) Field of Classification Search
CPC . C21D 9/085; C21D 1/42; C21D 1/58; C21D 1/60; C21D 1/18; C23C 8/22; C23C 8/80
See application file for complete search history.

(56) References Cited

U.S. PATENT DOCUMENTS

| | | |
|---|---|---|
| 2,983,158 A | 5/1961 | Hodlewsky et al. |
| 5,032,192 A | 7/1991 | Tsuchiya et al. |
| 2006/0207690 A1* | 9/2006 | Locke ....................... C23C 8/22 148/233 |

FOREIGN PATENT DOCUMENTS

| | | |
|---|---|---|
| EP | 1342651 | 9/2003 |
| EP | 1659303 | 5/2006 |
| EP | 2811211 | 12/2014 |
| GB | 839821 | 6/1960 |

* cited by examiner

Primary Examiner — Jessee R Roe

(57) ABSTRACT

A method for production of a track bushing for an undercarriage assembly is provided. The method includes carburizing a base material of the track bushing in less than 100 minutes and to a depth of less than 1000 microns. The base material is medium carbon steel. The method includes hardening the base material. The method includes tempering the base material.

11 Claims, 4 Drawing Sheets

TRACK BUSHING

TECHNICAL FIELD

The present disclosure relates to a track bushing, and more particularly to a method of production of the track bushing.

BACKGROUND

An endless track is used in an undercarriage system of a variety of track-type machines, such as, tractors, excavators, and so on. These endless tracks include track links that are interconnected to one another by track bushings.

During operation, the track bushing may experience excessive loading. Different surfaces of the track bushing, for example, an inner diameter, end ring surfaces, and so on may require abrasion resistance with increased strength and toughness to endure loads that may be imposed on the track bushing. The track bushing is generally made of low or medium carbon steel. The track bushing is deep carburized, forming carbon layers to depths of approximately 3000 microns on surfaces of the track bushing. Further, the track bushing may undergo air cooling and re-heat hardening. Additionally, the track bushing may be tempered to produce the track bushing of desired hardness.

However, time taken for carburizing the track bushing by known processes may be significant, often taking approximately between 10 and 24 hours. Thus, the production of the track bushing may be a time consuming, laborious, and costly process.

U.S. Pat. No. 5,032,192 describes a production method for an endless track bushing wherein medium-carbon steel is selected as a bushing material, the bushing material is carburized, quench-hardened, and then tempered. In the quenching, the bushing material is induction-heated from an outside surface of the bushing material only.

SUMMARY OF THE DISCLOSURE

In one aspect of the present disclosure, a method for production of a track bushing for an undercarriage assembly is provided. The method includes carburizing a base material of the track bushing in less than 100 minutes and to a depth of less than 1000 microns. The base material is medium carbon steel. The method includes hardening the base material. The method includes tempering the base material.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
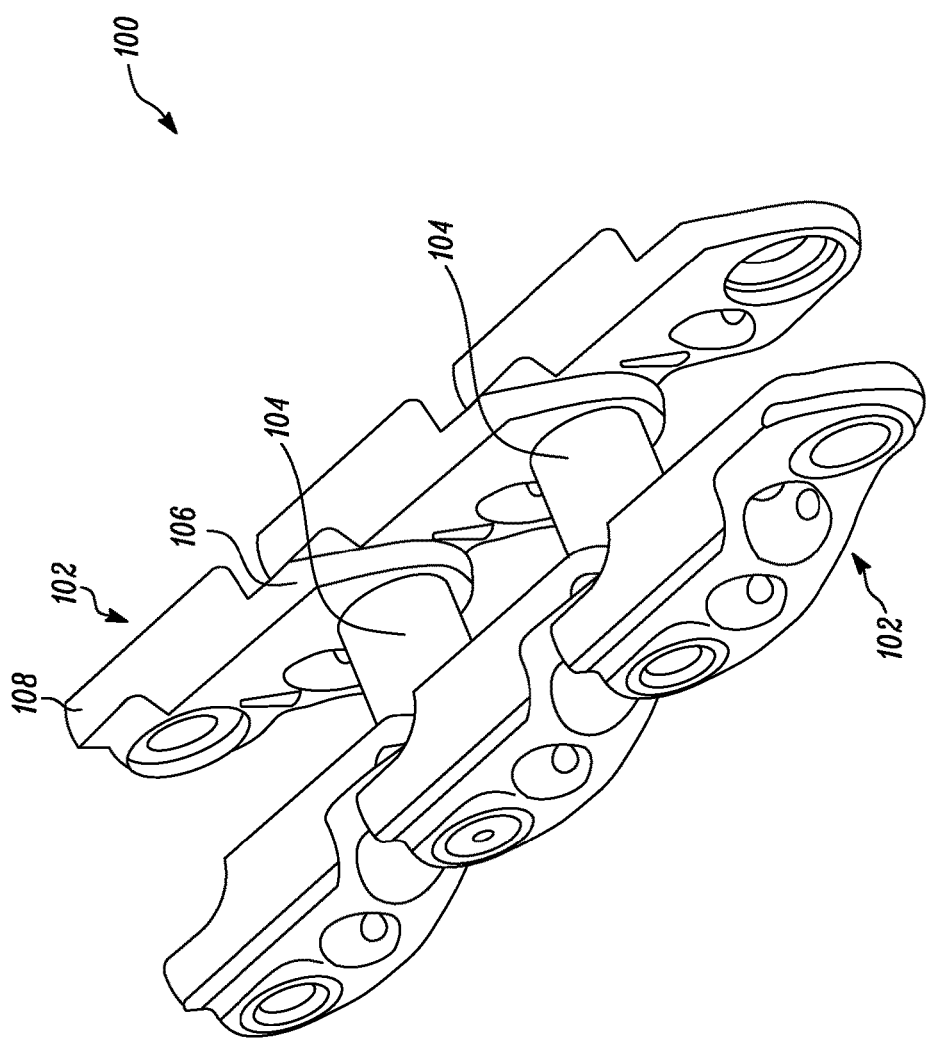
FIG. 1 is a perspective view of a portion of a track of an exemplary undercarriage assembly, according to various concepts of the present disclosure.

FIG. 1 illustrates a portion of an exemplary track assembly 100 for an undercarriage assembly of a track-type machine. For example, the track-type machine may be a loader, a tractor, an excavator, a tank, or any other mobile machine having track-type traction devices. When operated, a drive sprocket of the track-type machine (not shown) may rotate the track assembly 100 about one or more idlers or other guiding components (not shown) to facilitate movement of the track-type machine.

The track assembly 100 may include a series of links 102 joined to each other by laterally disposed track bushings 104. As shown, the links 102 are offset links. That is, each of the links 102 has an inwardly offset end 106 and an outwardly offset end 108. The inwardly offset end 106 of each of the links 102 are joined to the respective outwardly offset end 108 of each of the adjacent links. In addition, the inwardly offset end 106 of each of the links 102 may be joined to the inwardly offset end 106 of the opposing link, and the outwardly offset end 108 of each of the links 102 may be joined to the outwardly offset end 108 of the opposing link by the track bushing 104. It should be understood, however, that links 102 need not be offset links. Rather, in some embodiments, the links 102 may include inner links and outer links. In such embodiments, both ends of each opposing pair of inner links are positioned between ends of opposing outer links, as is known in the art.

Figure 2:
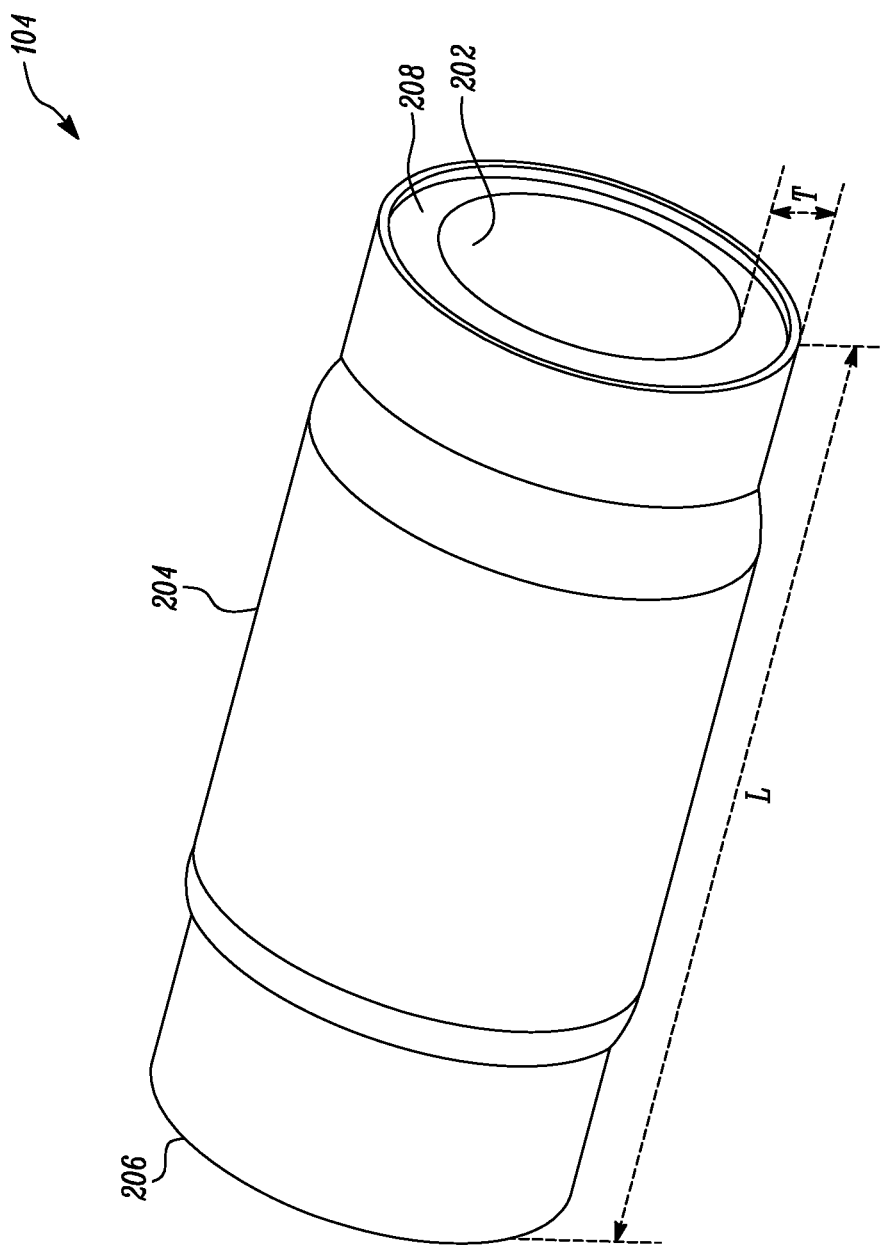
FIG. 2 is a perspective view of a track bushing of the undercarriage assembly of FIG. 1, according to various concepts of the present disclosure.

The present disclosure relates to the production of the track bushing 104 104. Referring to FIG. 2, the track bushing 104 has a generally hollow cylindrical shape including an inner curved surface area 202 and an outer curved surface 204 area defining a thickness "T" of the track bushing 104 therebetween. The track bushing 104 also has a first end ring 206 and a second end ring 208 defining a length "L" of the track bushing 104. The track bushing 104 is made of medium carbon steel. The carbon content of a base material 302 (see FIG. 3) of the track bushing 104 lies approximately between 0.4 and 0.6% carbon by weight. The shape and dimensions of the track bushing 104 may vary based on the application.

Figure 3:
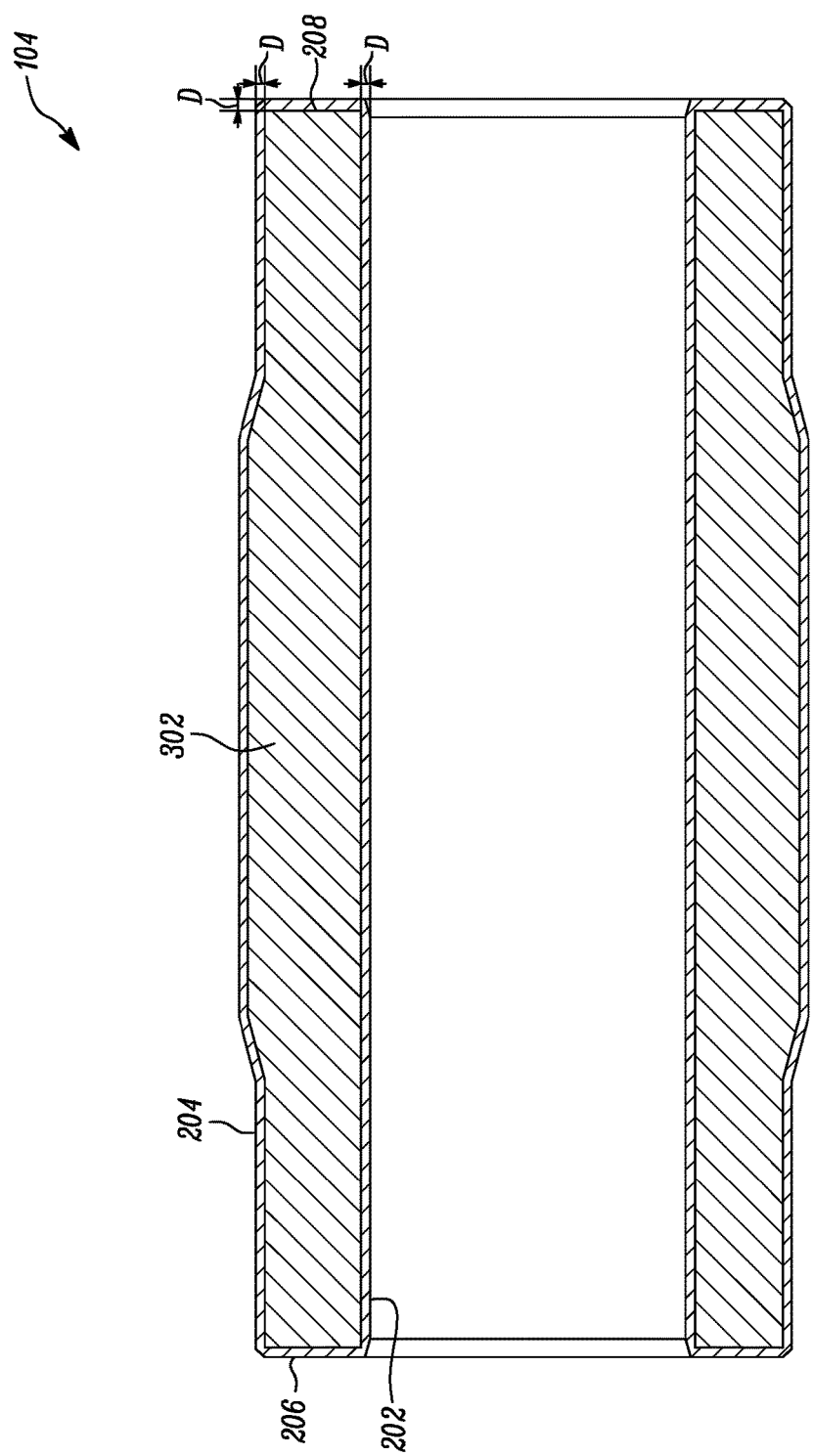
FIG. 3 is a cross-sectional view of the track bushing of FIG. 2, according to various concepts of the present disclosure.

Referring to FIG. 3, the track bushing 104 undergoes carburization in which carbon penetrates into the base material 302 to a given depth "D" within the base material 302 of the track bushing 104. A person of ordinary skill in the art will appreciate that carburizing, also referred to as case hardening, is a heat treatment process that produces a surface which is resistant to wear, while maintaining toughness and strength of the core. This treatment is applied to the track bushing 104 after machining. Carburizing increases strength and wear resistance of the track bushing 104 by diffusing the carbon into the base material 302 of the track bushing 104, creating a case of the depth "D" while retaining a substantially lesser hardness in the core of the base material 302.

More particularly, the track bushing 104 undergoes skin carburization which is a relatively short diffusion process of approximately less than 100 minutes in which the carbon penetrates to the depth "D" of approximately less than 1000 microns into the base material 302 of the track bushing 104. Carburizing may be done by heating the track bushing 104 in either a pit furnace, sealed atmosphere furnace, or continuous carburizing furnace, and introducing carburizing gases at that temperature. For example, the track bushing 104 may be carburized in the pit furnace at approximately 930° C. It should be noted that gas carburizing allows for accurate control of both the process temperature and the carburizing atmosphere (carbon potential). Since carburizing is a time and/or temperature based process, a carburizing atmosphere is introduced into the furnace for the required time to ensure that a correct carbon depth "D" is diffused into the base material 302. Further, the carbon potential of the gas may be adjusted to control the diffusion of the carbon into the base material 302. It should be noted that inward diffusion of the carbon into the base material 302 takes place at a rate which depends on the chemical composition of the base material 302 of the track bushing 104, carburizing temperature, and chemical composition of a carburizing mixture, among other factors.

As shown the diffusion of the carbon may take place on the inner curved surface area 202, the first and second end rings 206, 208. Additionally or optionally, the carbon may also diffuse into the outer curved surface area 204 of the track bushing 104. As described, the depth "D" of the carbon diffused into the base material 302, which is the inner curved surface area 202, the first end ring 206, the second end ring 208, and/or the outer curved surface area 204 is less than about 1000 microns. In some embodiments, the base material 302 is carburized to the depth "D" of approximately between 200 and 800 microns. In other embodiments, the base material 302 may be carburized to the depth "D" of about 200 to 600 microns.

The base material 302 of the track bushing 104 is carburized in a relatively short diffusion process owing to the selection of the base material 302, which is the medium carbon steel, and the depth "D" of less than 1000 microns. For example, carburizing the base material 302 to the depth "D" of about 200 microns may take approximately 28 minutes. In another example, carburizing the base material 302 to the depth "D" of approximately between 200 and 600 microns may take less than 30 minutes. In yet example, carburizing the base material 302 to the depth "D" about 800 microns in less than 60 minutes.

After carburizing, the track bushing 104 may either be cooled for later quench hardening, or quenched directly into oil. Selection of the quenching process may be made to achieve optimum properties with acceptable levels of dimensional change. A person of ordinary skill in the art will appreciate that steel parts, such as the track bushing 104, may require a heat treatment to obtain improved mechanical properties, such as increased hardness or strength. The hardening process consists of heating the track bushing 104 above the critical (normalizing) temperature, holding at this temperature for fixed time period, and cooling at a rate fast enough to allow the base material 302 of the track bushing 104 to transform to a much harder, stronger structure, followed by tempering.

In some embodiments, oil quenching of the base material 302 may be carried out using known methods. It should be noted that the base material 302 may be cooled and oil quenched in the same furnace. Alternatively, the base material 302 may be water quenched. For water quenching, the base material 302 may be cooled by force air cooling in a different chamber of the furnace and reheating the base material 302, followed by the water quenching of the base material 302. In other embodiments, any other suitable hardening process may be utilized without deviating from the scope of the present disclosure.

Thereafter, the base material 302 is tempered to achieve the desired toughness. It should be noted that steel is essentially an alloy of iron and carbon. Heating the base material 302 above the critical temperature causes the carbon and the other elements to go into solid solution. Quenching "freezes" the microstructure, inducing stresses. Tempering is the process of reheating the track bushing 104 at a relatively low temperature leading to precipitation and spheroidization of the carbides present in the microstructure. The temperature and time may be controlled to produce final properties required of the track bushing 104, for example, hardness, strength, and toughness for the intended application. Tempering may also be effective in relieving the stresses induced by quenching.

Alternatively, the track bushing 104 may be cooled using air cooling and then hardened using dual scan induction hardening. In one example, scan surface hardening may be conducted on a portion (approximately 80% and above) of the thickness "T" of the track bushing 104, and then shallow induction hardening may be conducted on the inner curved surface area 202 to obtain required hardness on the inner curved surface area 202 of the track bushing 104. The core of the track bushing 104 may have a heat affected zone created between the outer curved surface area 204 and the inner curved surface area 202. It should be noted that dual scan induction hardening may be utilized for relatively larger sized track bushings.

INDUSTRIAL APPLICABILITY

Figure 4:
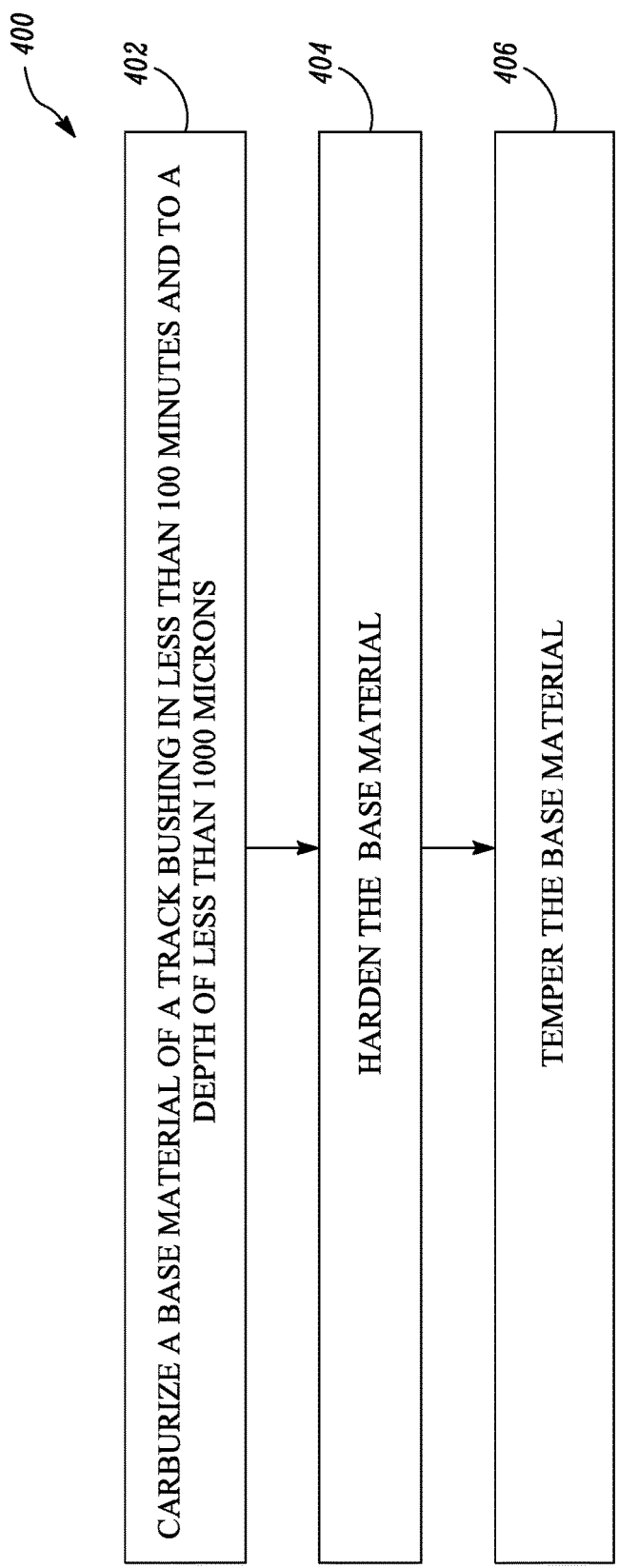
FIG. 4 is a flow chart of a method for production of the track bushing, according to various concepts of the present disclosure.

The present disclosure relates to a method of production of the track bushing 104. Referring to FIG. 4, at step 402, the base material 302 of the track bushing 104 is carburized to the depth "D" of less than 1000 microns and in less than 100 minutes. At step 404, the base material 302 of the track bushing 104 is hardened. At step 406, the base material is tempered.

In the present disclosure, carburizing the base material 302 may increase the hardness of the respective surfaces to more than 60 HRC. As described earlier, the depth "D" of carburizing the base material 302 is less than 1000 microns. The time for carburizing the base material 302 is greatly reduced to less than 100 minutes, as compared to that of known methods. In some cases, for carburizing the base material 302 to the depth "D" of 200 about microns, the carburizing process may take as less as approximately 28 minutes. Thus, the present disclosure offers a solution in which there is an 80% reduction in carburizing process time as compared to other known methods. It should be noted that the present disclosure does not change the carburizing process but causes a major reduction in the carburizing time because of relatively less carburizing depth "D", as is needed to meet the requirements for this application. The significant decrease in the carburizing time may additionally shorten the process flow of manufacturing these track bushings 104, improving the potential for adopting a single piece flow and automation technology in the manufacturing of these track bushings 104.

Further, the track bushing 104 may be carburized at the inner curved surface area 202, the first end ring 206, and the second end ring 208, improving a galling resistance of the track bushing 104, specifically on the inner curved surface area 202 and end faces of the track bushing 104. Also, skin carburizing on medium carbon steel may improve seal grooving at the end faces of the track bushing 104 during operation.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for production of a track bushing for an undercarriage assembly, the method comprising:
   carburizing a base material of the track bushing in less than 100 minutes and to a depth of less than 1000 microns, wherein the base material is medium carbon steel;
   hardening the base material; and
   tempering the base material.

2. The method of claim 1, wherein carburizing the base material includes carburizing the base material to a depth between 200 and 800 microns.

3. The method of claim 1, wherein hardening the base material includes oil quenching the base material.

4. The method of claim 1, wherein hardening the base material includes:
   cooling the base material; and
   water quenching the base material.

5. The method of claim 4, wherein cooling the base material includes air cooling the base material.

6. The method of claim 1, wherein hardening the base material includes:
   cooling the base material; and
   dual scan induction hardening the base material.

7. The method of claim 1, wherein the medium carbon steel contains between 0.4 and 0.6% carbon by weight.

8. The method of claim 1, wherein the track bushing includes an inner curved surface area, an outer curved surface area, a first end ring, and a second end ring, and wherein carburizing the base material includes carburizing the inner curved surface area, and the first and second end rings.

9. The method of claim 8, wherein carburizing the base material further includes carburizing the outer curved surface area.

10. The method of claim 1, wherein carburizing the base material includes carburizing the base material to a depth of about 200 microns in 28 minutes.

11. The method of claim 1, wherein carburizing the base material includes carburizing the base material to a depth of about 800 microns in less than 60 minutes.

* * * * *